(12) United States Patent
Lakshminarayan et al.

(10) Patent No.: US 11,265,725 B2
(45) Date of Patent: *Mar. 1, 2022

(54) SYSTEMS AND METHODS FOR ALLOCATING WIRELESS COMMUNICATION CHANNELS

(71) Applicant: Ademco Inc., Golden Valley, MN (US)

(72) Inventors: Nagaraj Chickmagalur Lakshminarayan, Bangalore (IN); Arun Handanakere Sheshagiri, Bangalore (IN)

(73) Assignee: Ademco Inc., Golden Valley, MN (US)

(*) Notice: Subject to any disclaimer, the term of this patent is extended or adjusted under 35 U.S.C. 154(b) by 247 days.

This patent is subject to a terminal disclaimer.

(21) Appl. No.: 16/277,603

(22) Filed: Feb. 15, 2019

(65) Prior Publication Data
US 2020/0267561 A1    Aug. 20, 2020

(51) Int. Cl.
*H04W 72/04* (2009.01)
*H04W 16/14* (2009.01)
*H04W 84/12* (2009.01)

(52) U.S. Cl.
CPC ......... *H04W 16/14* (2013.01); *H04W 72/048* (2013.01); *H04W 84/12* (2013.01)

(58) Field of Classification Search
None
See application file for complete search history.

(56) References Cited

U.S. PATENT DOCUMENTS 4,593,273 A    6/1986 Narcisse
5,193,216 A    3/1993 Davis
(Continued)

FOREIGN PATENT DOCUMENTS

CN    103227668 A    7/2013
EP       1950889 A1    7/2008
(Continued)

OTHER PUBLICATIONS

B. H. Jung et al., "Ubiquitous Wearable Computer (UWC)-Aided Coexistence Algorithm in an Overlaid Network Environment of WLAN and ZigBee Networks," 2007 2nd International Symposium on Wireless Pervasive Computing, San Juan, 2007, pp. 212-217. (best available copy).

(Continued)

*Primary Examiner* — Willie J Daniel, Jr.
(74) *Attorney, Agent, or Firm* — Fredriksen & Byron, P.A.

(57) ABSTRACT

Systems and methods for avoiding interference are provided. Such systems and methods can include receiving wireless network information from a first access point, the wireless network information identifying any channels used by any WiFi networks detected by a first access point, identifying any second information channel sequences used by any second access points located within a predetermined distance of the first access point, identifying and allocating a first information channel sequence to be used by the first access point so that no channels in the first information channel sequence overlap with any of the channels used by the WiFi networks or with the second information channel sequences, identifying and allocating a first operating channel sequence to be used by the first access point based on the first information channel sequence, and transmitting the first information channel sequence and the first operating channel sequence to the first access point.

15 Claims, 5 Drawing Sheets

(56) References Cited

U.S. PATENT DOCUMENTS

| | | | |
|---|---|---|---|
| 5,590,131 A | 12/1996 | Kabatepe | |
| 5,684,790 A | 11/1997 | Hirasawa | |
| 5,719,859 A | 2/1998 | Kobayashi et al. | |
| 6,356,771 B1 | 3/2002 | Dent | |
| 6,377,608 B1 | 4/2002 | Zyren | |
| 6,690,657 B1 | 2/2004 | Lau et al. | |
| 7,058,040 B2 | 6/2006 | Schmidt | |
| 7,079,831 B2 | 7/2006 | Schwartzman et al. | |
| 7,359,738 B2 | 4/2008 | Daniels et al. | |
| 7,430,400 B2 | 9/2008 | Russo et al. | |
| 7,817,612 B2 | 10/2010 | Morioka | |
| 7,974,230 B1 | 7/2011 | Talley et al. | |
| 8,107,427 B1 | 1/2012 | Husted et al. | |
| 8,228,859 B2 | 7/2012 | Wang et al. | |
| 8,315,573 B2 | 11/2012 | Bishop | |
| 8,325,627 B2 | 12/2012 | Pratt, Jr. et al. | |
| 8,488,478 B1 | 7/2013 | Leytus | |
| 8,611,268 B1 | 12/2013 | Thandaveswaran | |
| 8,839,389 B2 | 9/2014 | Cohen et al. | |
| 9,072,107 B2 | 6/2015 | Gauvreau et al. | |
| 9,124,359 B2 | 9/2015 | Ho | |
| 9,312,976 B2 | 4/2016 | Zhang | |
| 9,420,592 B2 | 8/2016 | Choi et al. | |
| 9,439,197 B1 | 9/2016 | Ngo et al. | |
| 9,603,152 B2 | 3/2017 | Nam et al. | |
| 9,699,786 B2 | 7/2017 | Ngo et al. | |
| 9,736,703 B2 | 8/2017 | Goldsmith et al. | |
| 9,832,674 B2 | 11/2017 | Ghai | |
| 9,913,232 B2 | 3/2018 | Seo et al. | |
| 10,039,052 B2 | 7/2018 | Zhao et al. | |
| 10,051,494 B2 | 8/2018 | Rengarajan et al. | |
| 10,091,786 B2 | 10/2018 | Schmidl et al. | |
| 10,129,916 B1 | 11/2018 | Lakshminarayan | |
| 10,499,405 B2 | 12/2019 | Lee et al. | |
| 10,637,718 B2 * | 4/2020 | Lakshminarayan | G08B 21/182 |
| 10,813,094 B2 | 10/2020 | Schmidl et al. | |
| 2002/0142767 A1 | 10/2002 | Mears et al. | |
| 2002/0196803 A1 | 12/2002 | Ota | |
| 2005/0195088 A1 | 9/2005 | Solak | |
| 2006/0031437 A1 | 2/2006 | Chambers | |
| 2006/0265195 A1 | 11/2006 | Woodard et al. | |
| 2007/0197256 A1 | 8/2007 | Lu et al. | |
| 2007/0239888 A1 | 10/2007 | Croxford | |
| 2007/0247366 A1 | 10/2007 | Smith et al. | |
| 2007/0268884 A1 | 11/2007 | Kolavennu et al. | |
| 2007/0279242 A1 | 12/2007 | Plocher et al. | |
| 2007/0296575 A1 | 12/2007 | Eisold et al. | |
| 2008/0279155 A1 | 11/2008 | Pratt, Jr. et al. | |
| 2008/0316966 A1 | 12/2008 | Joshi et al. | |
| 2009/0042546 A1 | 2/2009 | McClendon | |
| 2009/0112626 A1 | 4/2009 | Talbot et al. | |
| 2009/0203971 A1 | 8/2009 | Sciarappa et al. | |
| 2009/0303931 A1 | 12/2009 | Yamauchi | |
| 2010/0102940 A1 | 4/2010 | Baldwin et al. | |
| 2010/0176952 A1 | 7/2010 | Bajcsy et al. | |
| 2010/0271220 A1 | 10/2010 | Pattok et al. | |
| 2011/0019652 A1 | 1/2011 | Atwal | |
| 2011/0176465 A1 | 7/2011 | Panta et al. | |
| 2012/0093003 A1 | 4/2012 | Lin | |
| 2012/0106394 A1 | 5/2012 | Apostolakis | |
| 2012/0126700 A1 | 5/2012 | Mayfield et al. | |
| 2012/0172673 A1 | 7/2012 | Friedman et al. | |
| 2012/0201231 A1 | 8/2012 | Omeni | |
| 2012/0306284 A1 | 12/2012 | Lee et al. | |
| 2013/0029596 A1 | 1/2013 | Preston et al. | |
| 2013/0058318 A1 | 3/2013 | Bhatia et al. | |
| 2013/0077554 A1 | 3/2013 | Gauvreau et al. | |
| 2013/0149966 A1 | 6/2013 | Lee et al. | |
| 2013/0155957 A1 | 6/2013 | Shin et al. | |
| 2013/0336334 A1 | 12/2013 | Gilbert et al. | |
| 2014/0126655 A1 | 5/2014 | Vijayasankar et al. | |
| 2014/0218194 A1 | 8/2014 | Gruber et al. | |
| 2014/0233443 A1 | 8/2014 | Kumar | |
| 2014/0233536 A1 | 8/2014 | Kang et al. | |
| 2014/0321443 A1 | 10/2014 | Samudrala et al. | |
| 2014/0341109 A1 | 11/2014 | Cartmell et al. | |
| 2014/0376427 A1 | 12/2014 | Hui et al. | |
| 2015/0023314 A1 | 1/2015 | Thubert et al. | |
| 2015/0302728 A1 | 10/2015 | Gettings et al. | |
| 2016/0044661 A1 | 2/2016 | Suresh | |
| 2016/0165597 A1 | 6/2016 | Konopacki, Jr. et al. | |
| 2016/0269971 A1 | 9/2016 | Kim et al. | |
| 2017/0273013 A1 | 9/2017 | Edara et al. | |
| 2018/0324607 A1 | 11/2018 | Rengarajan et al. | |
| 2019/0281608 A1 | 9/2019 | Huang et al. | |
| 2020/0068578 A1 | 2/2020 | Lee et al. | |
| 2020/0296664 A1 * | 9/2020 | Lakshminarayan | H04W 4/80 |

FOREIGN PATENT DOCUMENTS

| | | | |
|---|---|---|---|
| EP | 2384078 A1 | 11/2011 | |
| EP | 2988541 A1 | 2/2016 | |
| KR | 1020090092495 A | 9/2009 | |
| KR | 1020160077992 A | 7/2016 | |
| WO | 9819400 A1 | 5/1998 | |
| WO | 2009116682 A1 | 9/2009 | |
| WO | 2010146174 A2 | 12/2010 | |
| WO | 2013033999 A1 | 3/2013 | |
| WO | 2015187860 A1 | 12/2015 | |
| WO | 2017143320 A1 | 8/2017 | |

OTHER PUBLICATIONS

M. L. Huang and S. Park, "A WLAN and ZigBee Coexistence Mechanism for Wearable Health Monitoring System," 2009 9th International Symposium on Communications and Information Technology, Icheon, Korea (South), 2009, pp. 555-559.

H. Khojasteh, M. Misic and V. B. Misic, "A two-tier integrated RFID/sensor network with a WiFi WLAN", 2012 8th International Wireless Communications and Mobile Computing Conference (IWCMC), Limassol, 2012, pp. 521-525. (best available copy).

Wikipedia, Near field communication, Downloaded from internet http://en.wikipedia.org/wiki/Near_field_communication on Sep. 9, 2019, 15 pgs.

* cited by examiner

| IC1,IC2 | 1 | 2 | 3 | 4 | 5 | 6 | 7 | 8 |
|---|---|---|---|---|---|---|---|---|
| 11,25 | 12,15,23 | 13,16,20 | 14,17,22 | 16,19,24 | 23,12,15 | 20,13,16 | 22,14,17 | 24,16,19 |
| 12,25 | 11,15,23 | 13,16,20 | 14,17,22 | 16,19,24 | 23,11,15 | 20,13,16 | 22,14,17 | 24,16,19 |
| 13,25 | 11,15,23 | 12,16,20 | 14,17,22 | 16,19,24 | 23,11,15 | 20,12,16 | 22,14,17 | 24,16,19 |

| 9 | 10 | 11 | 12 | 13 |
|---|---|---|---|---|
| 15,18,21 | 17,24,12 | 18,23,13 | 19,21,14 | 21,20,18 |
| 15,18,21 | 17,24,11 | 18,23,13 | 19,21,14 | 21,20,18 |
| 15,18,21 | 17,24,11 | 18,23,13 | 19,21,14 | 21,20,18 |

*FIG. 4*

SYSTEMS AND METHODS FOR ALLOCATING WIRELESS COMMUNICATION CHANNELS

FIELD

The present invention relates generally to systems and methods for wireless communication. More particularly, the present invention relates to systems and methods for allocating wireless communication channels to avoid wireless interference.

BACKGROUND

Increasing numbers of wirelessly connected devices are being installed or used in many buildings, structures, and homes. Indeed, many conventional devices, such as light switches, refrigerators, lamps, televisions, security sensors, locks, etc., are now wirelessly connected to wireless networks for the convenience of homeowners, business owners, or other users. Such devices are commonly called "Internet-of-Things" (IoT) devices.

As the numbers of wirelessly connected devices increase, the possibility for wireless interference also increases. In this regard, wireless interference is increasingly likely in densely populated areas or structures, such as condominiums, apartment buildings, or office buildings, where the numbers of wireless devices are even more concentrated. As such, there is a continuing need for improved systems and methods for avoiding wireless interference.

BRIEF DESCRIPTION OF THE DRAWINGS

FIG. 4 is a graph of exemplary operating channel sequences in accordance with disclosed embodiments.

DETAILED DESCRIPTION

Figure 1:
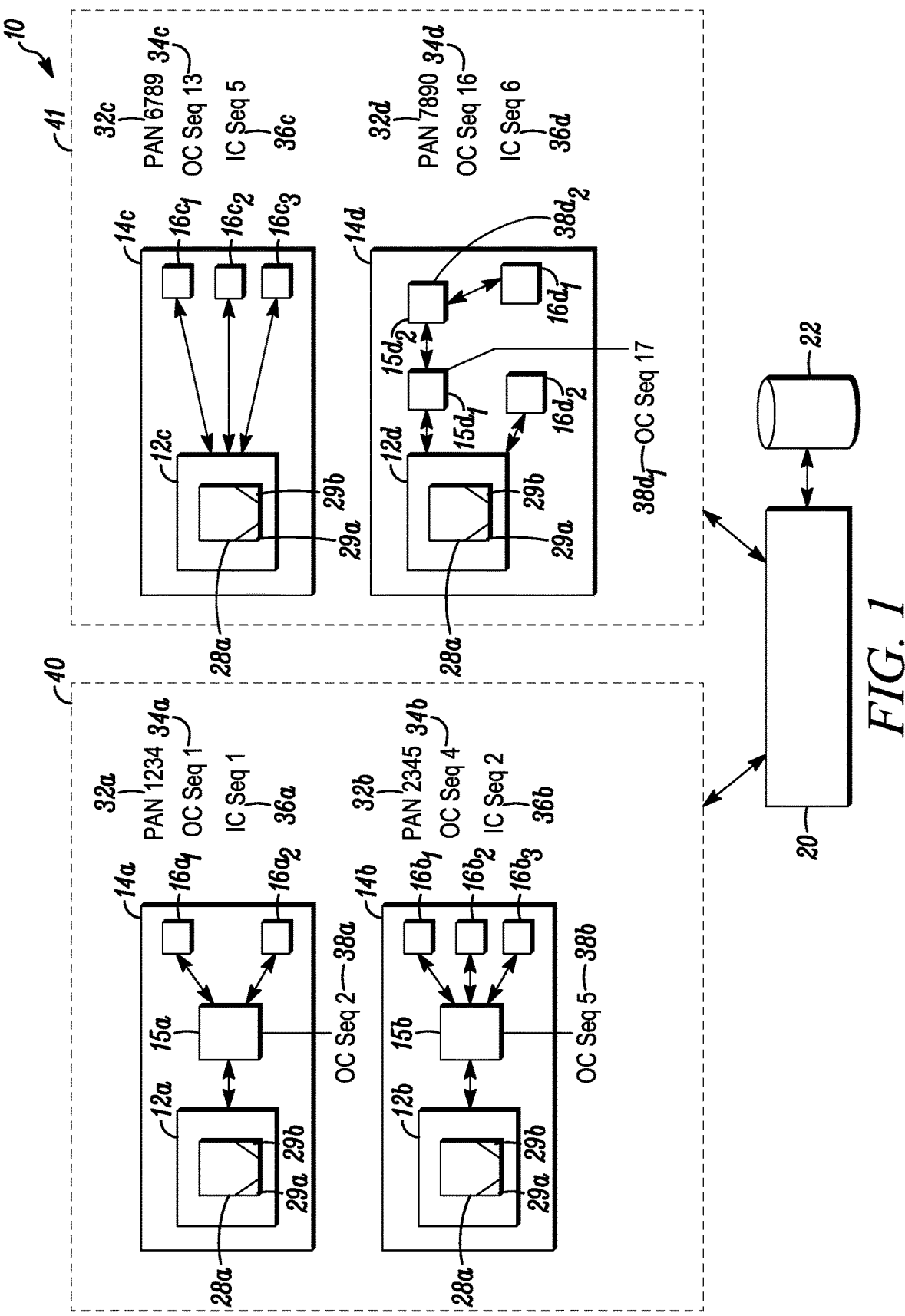
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for allocating wireless communication channels to avoid wireless interference during wireless communication between wireless devices, such as Internet-of-Things (IoT) devices. According to exemplary embodiments, an access point control panel can be recognized by a street address or GPS coordinates where the access point control panel is installed, and the access point control panel can detect nearby wireless network information, such as a number of WiFi (IEEE 802.11) sources detected within range of the access point control panel, signal strengths of the WiFi sources detected, channel bandwidths of the WiFi sources detected, and other wireless communication, such as IEEE 802.15.4 communication.

In some embodiments, the access point control panel can transmit the street address (or the GPS coordinates) and the wireless network information detected to a remote server or device, and the remote server or device can identify an information channel sequence and an operating channel sequence that can be used by the access point control panel. In some embodiments, the remote server or device can identify the information channel sequence and the operating channel sequence that can be used by any repeaters connected to the access point control panel, either directly or indirectly. In some embodiments, the remote server or device can select the information channel sequences or the operating channel sequences that can be used by the access point control panel and the repeaters to avoid interference with wireless communication signals from other nearby devices, such as another access point control panel.

FIG. 1 is a block diagram of a system 10 in accordance with disclosed embodiments. As seen in FIG. 1, the system 10 can include a plurality of wireless networks 14a, 14b, 14c, 14d. It is to be understood that any of the plurality of wireless networks 14a, 14b, 14c, 14d can include a connected home system, a security system, or the like.

For example, a first of the plurality of wireless networks 14a can include a first control panel 12a, a first repeater 15a, and a first plurality of sensors $16a_1$, $16a_2$. According to exemplary embodiments, the first control panel 12a, the first repeater 15a, and the first plurality of sensors $16a_1$, $16a_2$ can be located within or near a first spatial area, such as a home, an apartment, an office suite, or the like, and can be associated with the first spatial area.

According to exemplary embodiments, the first control panel 12a can communicate with the first plurality of sensors $16a_1$, $16a_2$ via the first repeater 15a such that the first repeater 15a can extend a range of the first wireless network 14a so that the first plurality of sensors $16a_1$, $16a_2$ can be installed or located a greater distance away from the first control panel 12a. Although not illustrated, the first control panel 12a can alternatively communicate directly with the first plurality of sensors $16a_1$, $16a_2$ without using the first repeater 15a as an intermediary. According to exemplary embodiments, all communication between the first control panel 12a, the first repeater 15a, and the first plurality of sensors $16a_1$, $16a_2$ can be wireless, and such wireless communication can use any wireless communication protocol including, but not limited to IEEE 802.11, IEEE 802.15.4, Bluetooth, or the like. In some embodiments, the wireless communication in the first of the plurality of wireless networks 14a can use the IEEE 802.15.4 protocol modified by Honeywell's SiX™ network protocol.

Furthermore, a second of the plurality of wireless networks 14b can include a second control panel 12b, a second repeater 15b, and a second plurality of sensors $16b_1$, $16b_2$, $16b_3$. According to exemplary embodiments, the second control panel 12b, the second repeater 15b, and the second plurality of sensors $16b_1$, $16b_2$, $16b_3$ can be located within or near a second spatial area and associated with the second spatial area. Additionally, the second of the plurality of wireless networks 14b can be located proximate to the first of the plurality of wireless networks 14a, such as in the same apartment building, same office complex, or other structure.

According to exemplary embodiments, the second control panel 12a can communicate with the second plurality of sensors $16b_1$, $16b_2$, $16b_3$ via the second repeater 15b such that the second repeater 15b can extend the range of the second wireless network 14b so that the second plurality of sensors $16b_1$, $16b_2$, $16b_3$ can be installed or located a greater distance away from the second control panel 12b. Although not illustrated, the second control panel 12a can alternatively communicate directly with the second plurality of sensors $16b_1$, $16b_2$, $16b_3$ without using the second repeater 15b as an intermediary. According to exemplary embodiments, all communication between the second control panel 12b, the second repeater 15b, and the second plurality of sensors $16b_1$, $16b_2$, $16b_3$ can be wireless, and such wireless communication can use any wireless communication protocol including, but not limited to IEEE 802.11, IEEE 802.15.4, Bluetooth, or the like. In some embodiments, the wireless communication in the second of the plurality of wireless networks 14b can use the IEEE 802.15.4 protocol modified by Honeywell's SiX™ network protocol.

Furthermore, a third of the plurality of wireless networks 14c can include a third control panel 12c and a third plurality of sensors $16c_1$, $16c_2$, $16c_3$. According to exemplary embodiments, the third control panel 12b and the third plurality of sensors $16c_1$, $16c_2$, $16c_3$ can be located within or near a third spatial area and be associated with the third spatial area.

According to exemplary embodiments, the third control panel 12c can communicate directly with the third plurality of sensors $16c_1$, $16c_2$, $16c_3$. As such, the third of the plurality of wireless networks 14c can omit a repeater. For example, the third of the plurality of wireless networks 14c may not need a repeater to communicate with the third plurality of sensors $16c_1$, $16c_2$, $16c_3$ if, for example, the third spatial area is relatively small in area and all of the third spatial area is within the range of the third control panel 12c. According to exemplary embodiments, all communication between the third control panel 12c and the third plurality of sensors $16c_1$, $16c_2$, $16c_3$ can be wireless, and such wireless communication can use any wireless communication protocol including, but not limited to IEEE 802.11, IEEE 802.15.4, Bluetooth, or the like. In some embodiments, the wireless communication in the third of the plurality of wireless networks 14c can use the IEEE 802.15.4 protocol modified by Honeywell's SiX™ network protocol.

Furthermore, a fourth of the plurality of wireless networks 14d can include a fourth control panel 12d, a third repeater $15d_1$, a fourth repeater $15d_2$, and a fourth plurality of sensors $16d_1$, $16d_2$. According to exemplary embodiments, the fourth control panel 12d, the third repeater $15d_1$, the fourth repeater $15d_2$, and the fourth plurality of sensors $16d_1$, $16d_2$ can be located within or near a fourth spatial area and be associated with the fourth spatial area. Additionally, the fourth of the plurality of wireless networks 14d can be located proximate to the third of the plurality of wireless networks 14c, such as in the same apartment building, same office complex, or other structure.

According to exemplary embodiments, the fourth control panel 12d can communicate with a first of the fourth plurality of sensors $16d_1$ via the third repeater $15d_1$ and the fourth repeater $15d_2$ such that the third repeater $15d_1$ and the fourth repeater $15d_2$ can extend the range of the fourth wireless network 14d so that the first of the fourth plurality of sensors $16d_1$ can be installed or located a greater distance away from the fourth control panel 12d. Additionally, the fourth control panel 12d can directly communicate with a second of the fourth plurality of sensors $16d_2$. According to exemplary embodiments, all communication between the fourth control panel 12d, the third repeater $15d_1$, the fourth repeater $15d_2$, and the fourth plurality of sensors $16d_1$, $16d_2$ can be wireless, and such wireless communication can use any wireless communication protocol including, but not limited to IEEE 802.11, IEEE 802.15.4, Bluetooth, or the like. In embodiments, the wireless communication in the fourth of the plurality of wireless networks 14d can use the IEEE 802.15.4 protocol modified by Honeywell's SiX™ network protocol.

Each of the control panels 12a, 12b, 12c, 12d can communicate with a remote server or device 20. For example, the remote server or device 20 can receive wireless network information from the control panels 12a, 12b, 12c, 12d and, based thereon, identify respective wireless communication operating parameters for each of the plurality of wireless networks 14a, 14b, 14c, 14d. For example, the wireless network information can be detected by the control panels 12a, 12b, 12c, 12c and include any WiFi networks detected, signal strengths of the WiFi networks detected, channel bandwidths of the WiFi networks detected, any IEEE 802.15.4 networks detected, personal area network (PAN) IDs of the IEEE 802.15.4 networks detected, and channel sequences of the IEEE 802.15.4 networks detected. In some embodiments, the remote server or device 20 can also receive location information from the control panels 12a, 12b, 12c, 12d, such as a respective street address, door number, zip code, GPS coordinates, and/or MAC address associated with a respective one of the control panels 12a, 12b, 12c, 12d.

In some embodiments, the remote server or device 20 can store the wireless network information received and the location information received for each of the plurality of wireless networks 14a, 14b, 14c, 14d in a database device 22, can use the location information to determine whether any of the plurality of wireless networks 14a, 14b, 14c, 14d in communication with the remote server or device 20 are within a predetermined distance of any of the control panels 12a, 12b, 12c, 12d, and responsive thereto, can identify and allocate operating channel sequences and information channel sequences to be used by the control panels 12a, 12b, 12c, 12d and/or the repeaters 15a, 15b, $15d_1$, $15d_2$.

In any embodiment, each of the control panels 12a, 12b, 12c, 12d can include control circuitry 28, which can include one or more programmable processors 29a and executable control software 29b as would be understood by one of ordinary skill in the art. The executable control software 29b can be stored on a transitory or non-transitory computer readable medium, including, but not limited to local computer memory, RAM, optical storage media, magnetic storage media, and the like. In some embodiments, the control circuitry 28, the programmable processors 29a, and the executable control software 29b can execute and control some of the methods disclosed herein.

As explained above, the first of the plurality of wireless networks 14a and the second of the plurality of wireless networks 14b can be located proximate to, that is, within a predetermined distance of, each other. To avoid wireless interference, the remote server or device 20 can identify the first of the plurality of wireless networks 14a and the second of the plurality of wireless networks 14b as forming a first virtual wireless network 40. Similarly, as explained above, the third of the plurality of wireless networks 14c and the fourth of the plurality of wireless networks 14d can be located proximate to, that is, within the predetermined distance of, each other. To avoid the wireless interference, the remote server or device 20 can identify the third of the plurality of wireless networks 14c and the fourth of the plurality of wireless networks 14d as forming a second virtual wireless network 41. The first virtual wireless network 40 and the second virtual wireless network 41 can be formed using the systems and methods disclosed in U.S. Pat. No. 10,129,916, which is incorporated herein in its entirety.

According to exemplary embodiments, the remote server or device 20 can use the wireless network information received to allocate a respective, unique PAN ID 32a, 32b, 32c, 32d for each of the control panels 12a, 12b, 12c, 12d, a respective operating channel sequence 34a, 34b, 34c, 34d for each of the control panels 12a, 12b, 12c, 12d, and a respective information channel sequence 36a, 36b, 36c, 36d for each of the control panels 12a, 12b, 12c, 12d. Similarly, the remote server or device 20 can use the wireless network information received to allocate a respective operating channel sequence 38a, 38b, $38d_1$, $38d_2$ for each of the repeaters 15a, 15b, $15d_1$, $15d_2$. In this regard, the remote server or device 20 can allocate the respective operating channel sequence 34a, 34b, 34c, 34d, 38a, 38b, $38d_1$, $38d_2$ for each of the control panels 12a, 12b, 12c, 12d and for each of the repeaters 15a, 15b, $15d_1$, $15d_2$ and the respective information channel sequence 36a, 36b, 36c, 36d for each of the control panels 12a, 12b, 12c, 12d so that the respective operating channel sequence 34a, 34b, 34c, 34d, 38a, 38b, $38d_1$, $38d_2$ for each of the control panels 12a, 12b, 12c, 12d and for each of the repeaters 15a, 15b, $15d_1$, $15d_2$ and the respective information channel sequence 36a, 36b, 36c, 36d for each of the control panels 12a, 12b, 12c, 12d fail to overlap with any the information channel sequences and the operating channel sequences used by any WiFi sources or IEEE 802.15.4 sources within the predetermined distance thereof. That is, the remote server or device 20 can allocate the information channel sequences and the operating channel sequences such that no two control panels or repeaters in a same one of the virtual area networks 40, 41 use a same one of the operating channel sequences or a same one of the information channel sequences.

The information channel sequences and the operating channel sequences can include a plurality of wireless channels (e.g. IEEE 802.15.4 channels) that can be used for the wireless communication, and the control panels 12a, 12b, 12c, 12d and the repeaters 15a, 15b, 15c, $15d_1$, $15d_2$ can use channel hopping to dynamically move between the plurality of wireless channels responsive to detecting interference on any of the plurality of wireless channels in the information channel sequences or the operating channel sequences. For example, a first of the information channel sequences can include two of the plurality of wireless channels, and a first of the operating channel sequences can include three of the plurality of wireless channels. In some embodiments, selection of one of the operating channel sequences can be based on which of the information channel sequences has been allocated to a particular device. Furthermore, in some embodiments, the remote server or device 20 can ensure that the plurality of wireless channels identified in each one of the operating channel sequences is not limited to a single WiFi channel, that is, is overlaps with more than one WiFi channel. As such, thirteen of the operating channel sequences can be associated with each of the information channel sequences.

As explained above in connection with the fourth of the plurality of wireless networks 14d, the fourth control panel 12d can communicate with the first of the fourth plurality of sensors $16d_1$ via the third repeater $15d_1$ and the fourth repeater $15d_2$, that is, via multiple layers of repeaters. In this regard, FIG. 2 is a block diagram of a multi-layer repeater architecture in accordance with disclosed embodiments.

Figure 2:
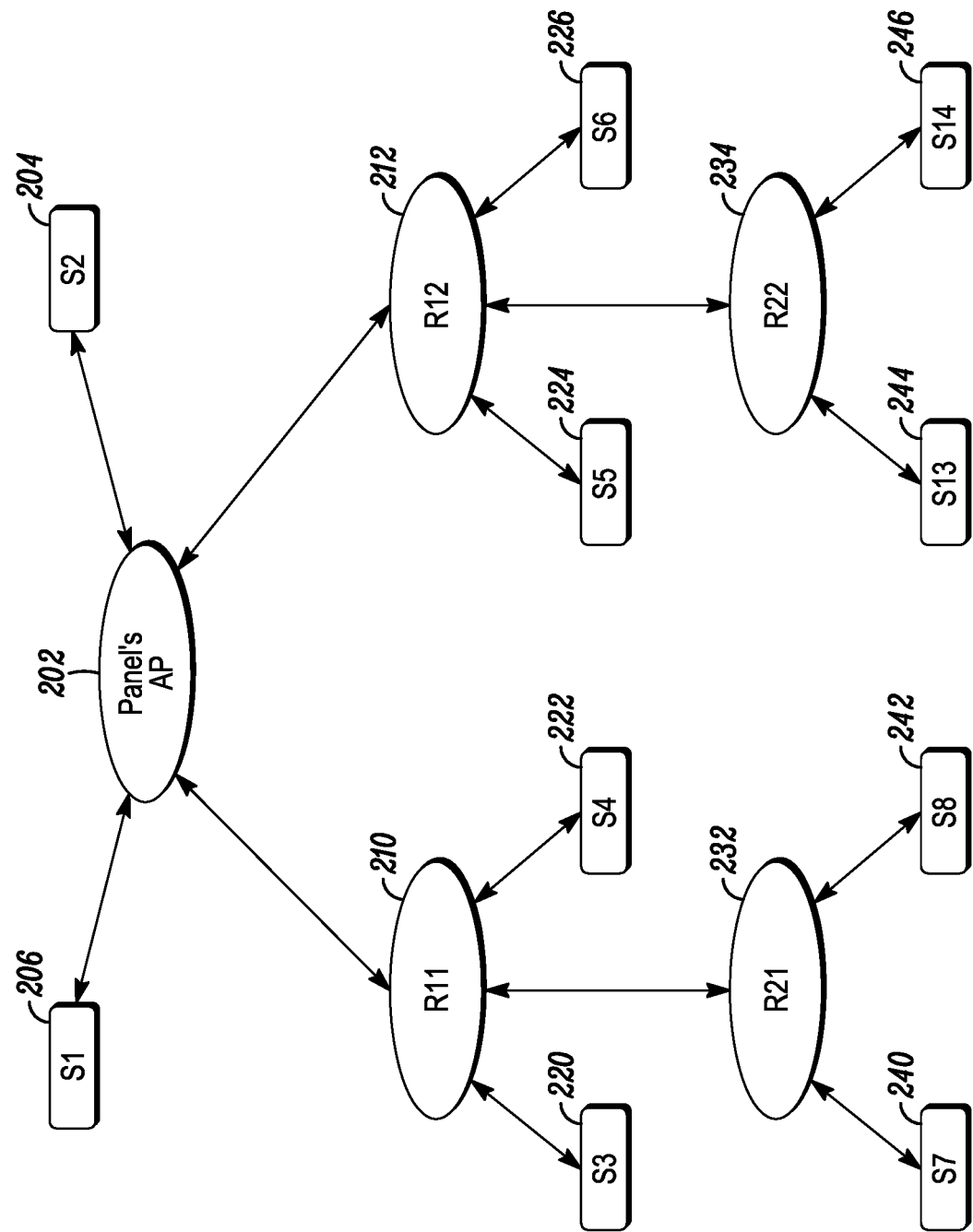
FIG. 2 is a block diagram of an access point and repeater architecture in accordance with disclosed embodiments.

As seen in FIG. 2, in some embodiments, a control panel 202 (e.g. an access point control panel) can wirelessly connect to one or more level zero sensors 204, 206 and to one or more level one repeaters 210, 212. Similarly, the one or more level one repeaters 210, 212 can wirelessly connect to one or more level one sensors 220, 222, 224, 226 and to one or more level two repeaters 232, 234. Accordingly, the one or more level one sensors 220, 222, 224, 226 can communicate with the control panel 202 via the one or more level one repeaters 210, 212. Each of the one or more level two repeaters 232, 234 can wirelessly connect to one or more level two sensors 240, 242, 244, 246, and the one or more level two sensors 240, 242, 244, 246 can communicate with the control panel 202 via the one or more level two repeaters 232, 234 and the one or more level one repeaters 210, 212.

It is to be understood that all devices in a single level (e.g. level zero includes the control panel 202 and the devices communicating with the control panel 202, level one includes the one or more level one repeaters 210, 212 and the devices communicating with the one or more level one repeaters 210, 212, and level two includes the one or more level two repeaters 232, 234 and the devices communicating with the one or more level two repeaters 232, 234) can share one operating channel sequence. As such, for example, the one or more level one repeaters 210, 212 can share one operating channel sequence.

As explained above, selection of operating channel sequences can depend on which information channel sequence a remote server or device assigns to a particular device. Additionally, the selection of the operating channel sequences can also depend on known WiFi channel bandwidths so that, as explained above, all of the operating channel sequences selected are not within a single WiFi channel, that is, the operating channel sequences selected overlap with more than one WiFi channel. In this regard, FIG. 3 is a graph of an exemplary allocation of the operating channel sequences assigned to a control panel, a first repeater, and a second repeater.

Figure 3:
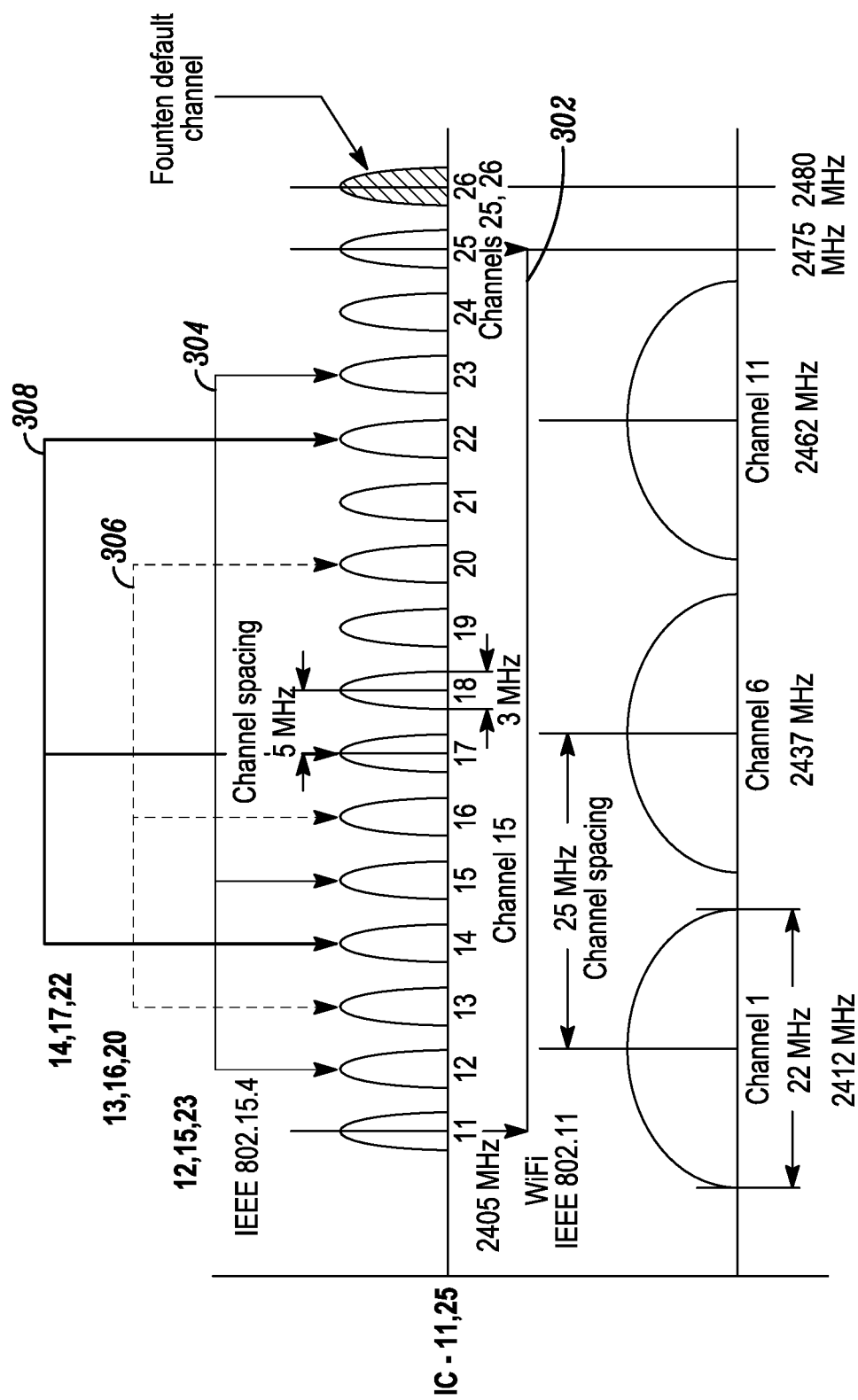
FIG. 3 is a graph of an exemplary allocation of operating channel sequences in accordance with disclosed embodiments.

As seen in FIG. 3, WiFi channels and IEEE 802.15.4 channels operate in approximately the same bandwidth (2.4 GHz) and can overlap. As would be known to one having skill in the art, IEEE 802.15.4 includes 16 channels spaced approximately 5 MHz apart, and WiFi sources generally use three non-overlapping channels: channels 1, 6, and 11.

In the example shown in FIG. 3, a remote server or device can allocate IEEE 802.15.4 channels 11 and 25 to be a first information channel sequence 302 for use by all devices on a single wireless network, including a control panel, repeaters, and any sensors. The remote server or device can receive wireless network information from the control panel that identifies a number of the repeaters in the single wireless network, and the remote server or device can assign operating channel sequences based on the number of the repeaters identified. In the example shown in FIG. 3, two of the repeaters are included in the single wireless network so the remote server or device can allocate three separate operating channel sequences: one for the control panel, one for a first of the two repeaters, and one for a second of the two repeaters. For example, the remote server or device can allocate to the control panel a first operating channel sequence 304 (channels 12, 15, 23) associated the first information channel sequence 302, the remote server or device 20 can allocate to the first of the two repeaters a second operating channel sequence 306 (channels 13, 16, and 20) associated with the first information channel sequence 302, and the remote server or device 20 can allocate to the second of the two repeaters a third operating channel sequence 308 (channels 14, 17, and 22) associated the first information channel sequence 302. As seen, all of the channels within a single one of the first, second, or third operating channel sequences 304 306, 308 are not within a single WiFi channel. That is, all of the channels within a single one of the first, second, or third operating channel sequences 304, 306, 308 overlap with more than one WiFi channel.

FIG. 4 is a graph of exemplary operating channel sequences for three information channel sequences in accordance with disclosed embodiment. However, as would be understood by one having skill in the art, systems and methods disclosed herein encompass more of the operating channel sequences and more of the information channel sequences than shown in FIG. 4. In some embodiments, the remote server or device can store the operating channel sequences and the information channel sequences in a database device as a table and can use the information channel sequences as a reference value to identify and allocate the operating channel sequences.

Figure 5:
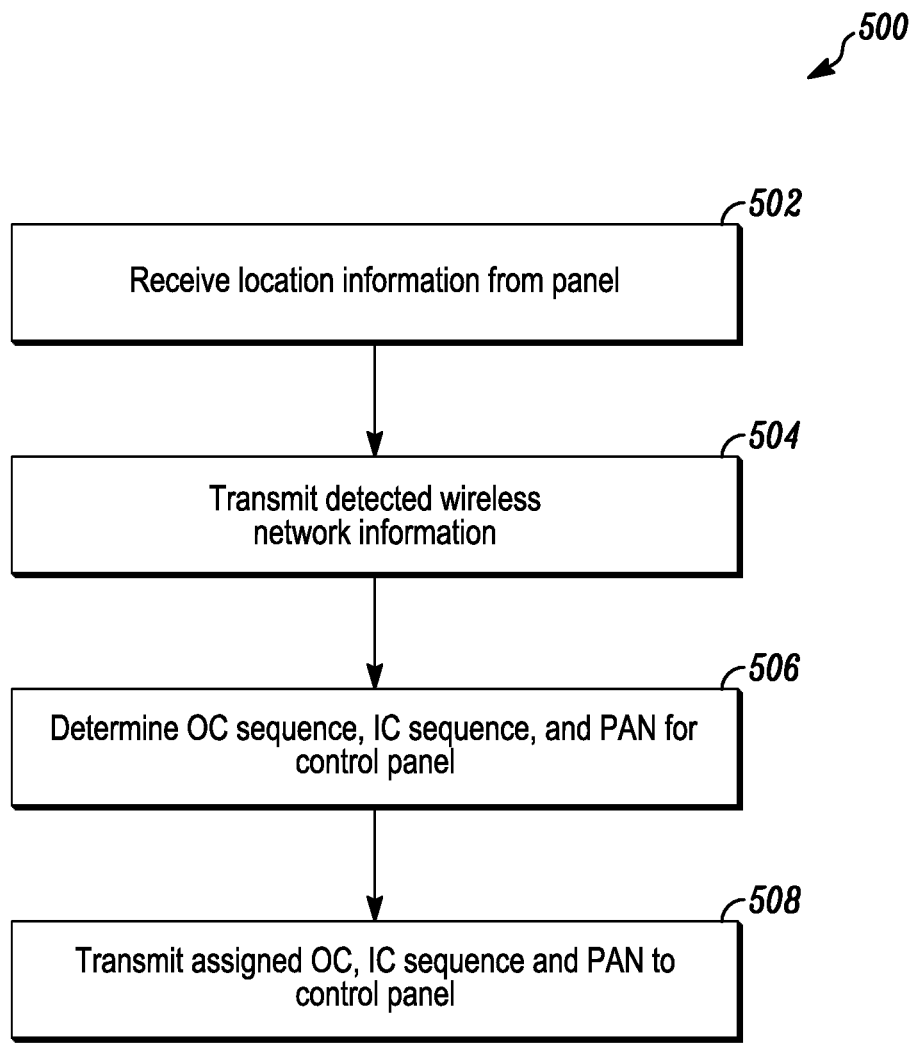
FIG. 5 is a flow diagram of a method in accordance with disclosed embodiments.

FIG. 5 is a flow diagram of a method 500 in accordance with disclosed embodiments. As seen in FIG. 5, the method 500 can include a remote server or device (e.g. the remote server or device 20) receiving location information from a control panel (e.g. the control panel 12a), as in 502. According to exemplary embodiments, the location information can include a street address, door, unit, suite number, and/or zip code where the control panel is installed and/or a MAC address of the control panel. In some embodiments, the method 500 can be executed during installation of the control panel.

Then, the method 500 can include the remote server or device receiving wireless network information from the control panel, as in 504. For example, the control panel can scan the 2.4 GHz band for WiFi signals and IEEE 802.15.4 wireless signals to identify the wireless network information. In these embodiments, the wireless network information can include a number of WiFi sources detected within range of the control panel, signal strengths of the WiFi sources detected, channels used by the WiFi sources detected, IEEE 802.15.4 sources detected within the range of the control panel (e.g. other control panels), channel sequences for the IEEE 802.15.4 sources detected, and PAN IDs for the IEEE 802.15.4 sources detected. Additionally or alternatively, in some embodiments, the at least some of the wireless network information, such as the IEEE 802.15.4 sources detected, can include identifications of the other control panels stored in a database device. In these embodiments, the remote server or device can use the location information received as in 502 to identify the IEEE 802.15.4 sources detected in the database device.

Then, the method 500 can include the remote server identifying an information channel sequence, a first operating channel sequence, and a unique PAN ID for the control panel, as in 506. In some embodiments, the remote server or device can allocate the information channel sequence so as to not overlap with any of the IEEE 802.15.4 sources detected or any of the WiFi sources detected. Additionally or alternatively, the remote server or device can use the wireless network information to identify the channels with the lowest amount of interference and allocate the information channel sequence to those channels. As explained above, the remote server or device can allocate the first operating channel sequence based on the information channel sequence allocated. Furthermore, if the wireless network information indicates that the control panel is connected to a repeater or the like, then the remote server or device can also allocate a second operating channel sequence for that repeater.

After identifying and allocating the information channel sequence and the operating channel sequence(s), the method 500 can include the remote server or device transmitting the information channel sequence and the operating channel sequence(s) to the control panel, as in 508. Then, the control panel can wirelessly communicate pursuant to the information channel sequence and the operating channel sequence(s) allocated thereto.

Although FIG. 5 is described in connection with the remote server or device identifying and allocating the information channel sequences and the operating channel sequences, it is to be understood that, in some embodiments, the control panel itself can identify and allocate the information channel sequences and the operating channel sequences based on the wireless network information that the control panel would otherwise communicate to the remote server or device.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   receiving wireless network information from a first access point, the wireless network information identifying any channels used by any WiFi networks detected by the first access point;
   identifying any second information channel sequences used by any second access points located within a predetermined distance of the first access point;
   identifying and allocating a first information channel sequence to be used by the first access point so that no channels in the first information channel sequence overlap with any of the channels used by the WiFi networks detected by the first access point or with the second information channel sequences of the second access points located within the predetermined distance of the first access point;
   based on the first information channel sequence, identifying and allocating a first operating channel sequence to be used by the first access point; and
   transmitting the first information channel sequence and the first operating channel sequence to the first access point.

2. The method of claim 1 further comprising:
   identifying and allocating a second operating channel sequence to be used by a repeater that is wirelessly connected to the first access point,
   wherein the second operating channel sequence is different than the first operating channel sequence.

3. The method of claim 1 further comprising:
   using the first information channel sequence as a variable to identify the first operating channel sequence from a reference table stored in a database device.

4. The method of claim 1 wherein the first access point uses an IEEE 802.15.4 protocol to communicate.

5. The method of claim 1 wherein the wireless network information includes the second information channel sequences used by the second access points located within the predetermined distance of the first access point.

6. The method of claim 1 further comprising:
receiving location information from the first access point;
using the location information to identify the second access points located within the predetermined distance of the first access point; and
identifying the second information channel sequences used by the second access points located within the predetermined distance of the first access point from a database device.

7. The method of claim 6 wherein the location information includes a door number and a zip code.

8. The method of claim 6 wherein the location information includes GPS coordinates.

9. The method of claim 1 wherein the first operating channel sequence includes a plurality of IEEE 802.15.4 channels, and wherein the plurality of IEEE 802.15.4 channels overlap with more than one WiFi channel.

10. A system comprising:
a first access point configured to wirelessly communicate via a first wireless network;
a second access point located within a predetermined distance of the first access point and configured to wirelessly communicate via a second wireless network; and
a processor configured to receive wireless network information from the first access point, identify and allocate a first information channel sequence to be used by the first access point when communicating via the first wireless network, and based on the first information channel sequence, identify and allocate a first operating channel sequence to be used by the first access point when communicating via the first wireless network,
wherein the wireless network information identifies any channels used by any WiFi networks detected by the first access point, and
wherein the processor identifies and allocates the first information channel sequence so that no channels in the first information channel sequence overlap with any of the channels used by the WiFi networks detected by the first access point or with a second information channel sequence used by the second access point.

11. The system of claim 10 further comprising:
a repeater configured to communicate with the first access point via the first wireless network,
wherein the processor identifies and allocates a second operating channel sequence to be used by the repeater, and
wherein the second operating channel sequence is different than the first operating channel sequence.

12. The system of claim 10 wherein the first access point uses an IEEE 802.15.4 protocol to communicate via the first wireless network.

13. The system of claim 10 further comprising:
a sensor,
wherein the first access point communicates with the sensor via the first wireless network.

14. The system of claim 10 further comprising:
a database device,
wherein the processor uses the first information channel sequence as a variable to identify the first operating channel sequence from a reference table stored in the database device.

15. The system of claim 10 wherein the first operating channel sequence includes a plurality of 802.15.4 channels, and wherein the plurality of 802.15.4 channels overlap with more than one WiFi channel.

* * * * *